United States Patent [19]

Itagaki et al.

[11] Patent Number: 4,863,972

[45] Date of Patent: Sep. 5, 1989

[54] POROUS CROSS-LINKED POLYVINYL ALCOHOL PARTICLES, PROCESS FOR PRODUCING THE SAME, AND SEPARATING AGENT COMPOSED OF THE SAME

[75] Inventors: Takaharu Itagaki; Hiroshi Kusano, both of Yokohama; Eiji Miyata, Kitakyushu; Takayuki Tashiro, Machida, all of Japan

[73] Assignee: Mitsubishi Chemical Industries Limited, Japan

[21] Appl. No.: 70,374

[22] Filed: Jul. 7, 1987

[30] Foreign Application Priority Data

Jul. 9, 1986 [JP] Japan ................. 61-161726

[51] Int. Cl.$^4$ .............................................. C08J 9/28
[52] U.S. Cl. ..................................... 521/141; 521/64; 525/61
[58] Field of Search ................... 521/141, 64; 525/61

[56] References Cited

U.S. PATENT DOCUMENTS

| | | | |
|---|---|---|---|
| 4,246,355 | 1/1981 | Bolto et al. | 521/38 |
| 4,306,031 | 12/1981 | Itagaki et al. | 521/28 |
| 4,314,032 | 2/1982 | Muroyama et al. | 521/52 |
| 4,350,773 | 9/1982 | Itagaki et al. | 521/31 |

Primary Examiner—Morton Foelak
Attorney, Agent, or Firm—Jordan B. Bierman

[57] ABSTRACT

Porous cross-linked polyvinyl alcohol particles which is used for a chromatographic medium is prepared by:

dispersing an aqueous solution of a mixture of polyvinyl alcohol and a salt in an organic solvent;

allowing a gel to form spontaneously from the dispersion; and reacting the gel with a cross-linking agent.

5 Claims, 3 Drawing Sheets

F/G. 1

POROUS CROSS-LINKED POLYVINYL ALCOHOL PARTICLES, PROCESS FOR PRODUCING THE SAME, AND SEPARATING AGENT COMPOSED OF THE SAME

BACKGROUND OF THE INVENTION

The present invention relates to porous cross-linked polyvinyl alcohol particles that are produced by first dispersing in an organic solvent an aqueous solution of polyvinyl alcohol to make spheres of polyvinyl alcohol solution, holding the dispersion in such a state that a gel will form spontaneously, and then reacting the gel with a cross-linking agent. The present invention also relates to a process for producing such porous cross-linked polyvinyl alcohol particles, as well as a separating agent composed of such particles. More particularly, the present invention relates to porous cross-linked polyvinyl alcohol particles that are suitable for use as packing materials in chromatography, especially in aqueous-phase gel permeation chromatography.

Water-insoluble crosslinked polyvinyl alcohol particles that are produced by reacting polyvinyl alcohol with a cross-linking agent are known but the so obtained polyvinyl alcohol is in a gel state. A method has therefore been proposed for producing a porous cross-linked polyvinyl alcohol by reacting polyvinyl alcohol with a cross-linking agent in water in which a salt is dissolved or finely suspended (Unexamined Published Japanese patent application No. 90804/81).

SUMMARY OF THE INVENTION

An object of the present invention is to provide macro-porous polyvinyl alcohol particles having a high exclusion limit of molecular weights that are produced by first dispersing in an organic solvent an aqueous solution of polyvinyl alcohol to make spheres of polyvinyl alcohol solution, holding the dispersion in such a state that a gel will form spontaneously, and then reacting the gel with a cross-linking agent.

Another object of the present invention is to provide a process for producing macro-porous polyvinyl alcohol particles having a high exclusion limit of molecular weight that are produced by first dispersing in an organic solvent an aqueous solution of polyvinyl alcohol to make spheres of polyvinyl alcohol solution, holding the dispersion in such a state that a gel will form spontaneously, and then reacting the gel with a cross-linking agent.

A further object of the present invention is to provide a packing material for use in chromatography that is composed of the macro-porous polyvinyl alcohol particles produced by the process described above.

DETAILED DESCRIPTION OF THE INVENTION

Figure 1:
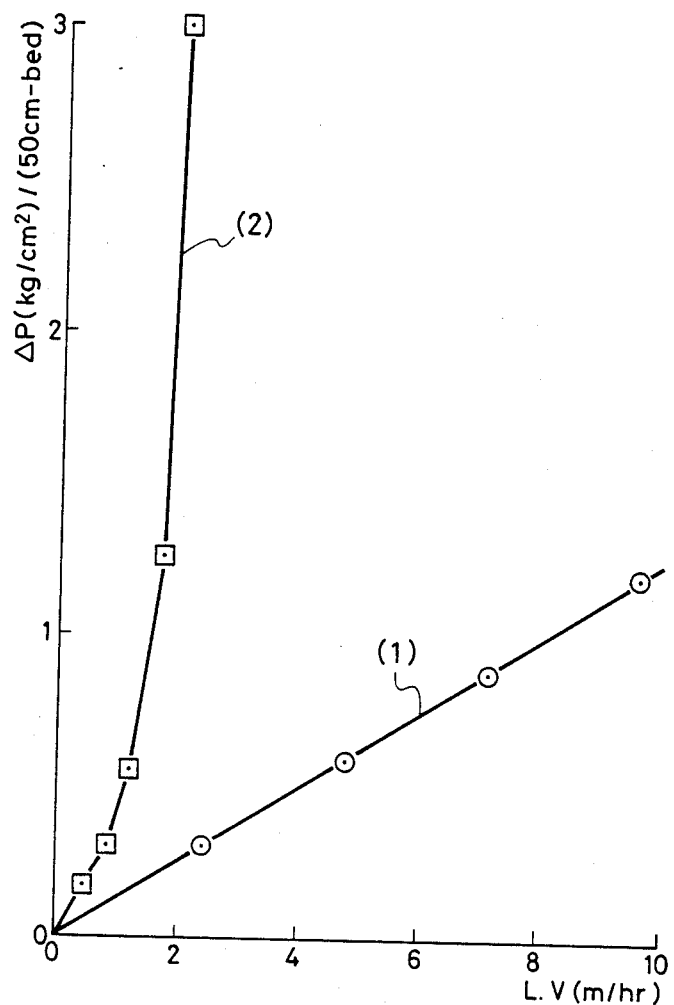
FIG. 1 is a graph showing the pressure loss vs flow rate profile for each of the packing material (1) composed of the cross-linked polyvinyl alcohol particles prepared in Example 1 and a comparison cross-linked agarose gel (2)

The term "spontaneous gelling" as used herein means the phenomenon in which polyvinyl alcohol dissolved in water insolubilized in the absence of any cross-linking agent used as a third component. When left to stand, an aqueous solution of polyvinyl alcohol increases in viscosity with time until a gel forms spontaneously. This phenomenon is believed to occur due to the hydrogen bonding between individual vinyl alcohol molecules. The higher the concentration of the aqueous polyvinyl alcohol solution and the lower the temperature at which it is left to stand, the more rapidly start gelation. The exact reason why the particles of the present invention which are produced by making use of the spontaneous gelling of an aqueous polyvinyl alcohol solution contains macro pores is not clear but most probably polyvinyl alcohol which precipitates from the reaction medium and undergoes phase separation due to spontaneous gelling to assume a heterogeneous and porous structure. The so formed macro pores differ essentially from the pores in a network structure that is formed by simply reacting polyvinyl alcohol with a cross-linking agent.

The present invention relates to porous cross-linked polyvinyl alcohol particles that are produced by first dispersing in an organic solvent an aqueous solution of a mixture of polyvinyl alcohol and a salt, holding the dispersion in such a state that a gel will form spontaneously, and then reacting the gel with a cross-linking agent. The present invention also relates to a process for producing such porous cross-linked polyvinyl alcohol particles, as well as a separating agent composed of such particles.

The polyvinyl alcohol that is suitable for use as the starting material in the present invention has a degree of polymerization in the range of from several tens to several thousands, preferably from 200 to 2,000, and a saponification degree of at least 90 mol%, preferably at least 95 mol%. Such polyvinyl alcohol is dissolved in water for a concentration of from 2 to 30%, preferably from 5 to 15% and placed under such a condition that a gel will form spontaneously. However, with the aqueous solution of polyvinyl alcohol alone, it will take so prolonged time for gelling spontaneously that in order to speed up the occurrence of spontaneous gelling, a salt is added to the aqueous polyvinyl alcohol solution. A suitable salt is sodium chloride, sodium sulfate or any other salt capable of coagulating and precipitating polyvinyl alcohol.

The amount in which the salt is added will vary with the specific type of salt used but it is usually added in an amount within the range of from 3% to the concentration where polyvinyl alcohol will not precipitate before spontaneous gelling. If sodium chloride is used as the salt, the amount of its addition will vary with the degree of polymerization and saponification of polyvinyl alcohol and its concentration. If, for example, an aqueous solution of 10% polyvinyl alcohol having a polymerization degree of 500 and a saponification degree of at least 98 mol% is used, sodium chloride is to be added in an amount of from 1 to 12% preferably from 3 to 10%. If the same polyvinyl alcohol is used as a 5% aqueous solution, sodium chloride is to be added in an amount of 1 to 15%, preferably 5 to 13%. Further acceleration of spontaneous gelling can be achieved by adding an alkali, such as sodium hydroxide, etc. to the aqueous polyvinyl alcohol solution to which the salt has been added.

According to the present invention, the salt-added aqueous polyvinyl alcohol solution is subjected to spontaneous gelling after it has been dispersed in particles in an organic solvent. Useful organic solvents include aromatic hydrocarbons such as toluene, benzene, chlorobenzene, dichlorobenzene, etc. and halogenated derivatives thereof; and aliphatic and alicyclic hydrocarbons such as n-heptane, n-hexane, liquid paraffin, cyclohexane, dichloromethane, dichloroethane, etc. and halogenated derivatives thereof. These organic solvents are typically used dependently but may be used in admixture.

The organic solvents are used in amounts which are at least twice, preferably from three to six times, the volume of the aqueous polyvinyl alcohol solution. The organic solvents preferably contain dispersion stabilizers such as oil-soluble cellulose compounds (e.g., ethyl cellulose, cellulose acetate butyrate, and ethyl hydroxyethyl cellulose) and other oil-soluble compounds as exemplified by gum arabic, sorbitan sesquioleate, sorbitan monooleate, and sorbitan monostearate. These dispersion stabilizers are typically used in amounts of from 0.05 to 10%, preferably from 0.1 to 5%, of the organic solvent.

After being dispersed in particles in the organic solvent, the aqueous polyvinyl alcohol solution is subjected to spontaneous gelling at a temperature of from 0° to 50° C., preferably from 3° to 30° C., for a period of from 2 to 200 hours, preferably from 5 to 100 hours.

After a gel forms spontaneously under these conditions, it is subjected to reaction with a cross-linking agent. Useful cross-linking agents are those which are capable of forming cross-linked portions with 2 or more carbon atoms between vinyl alcohol molecules, which include dialdehyde compounds such as glyoxal, glutaraldehyde and terephthalaldehyde; diepoxy compounds such as 1,2,3,4-diepoxybutane; glycidyl ether compounds such as ethylene glycol diglycidyl ether and 1,4-butanediol diglycidyl ether; and epihalohydrin compounds such as epichlorohydrin and epibromohydrin. Advantageous examples are dialdehyde compounds which form cross-linking with acetal bonding between vinyl alcohol molecules. The cross-linking agent is typically used in an amount of at least 4 mol% of the total hydroxyl groups in the polyvinyl alcohol.

Cross-linking reaction is carried out by adding the above-mentioned cross-linking agents to the gel that has formed spontaneously. Alternatively, the spherical particles resulting from the spontaneous gelling may be filtered to separate from organic solvent and the particle retained on the filter are subsequently washed with acetone or methanol and subjected to cross-linking reaction in water.

The cross-linking reaction that follows the spontaneous gelling is carried out at a temperature of from 0° to 100° C., preferably from 30° to 80° C., for a period of from 1 to 20 hours, preferably from 2 to 8 hours. The cross-linking reaction may be catalyzed to an acid such as hydrochloric acid or sulfuric acid or an alkali such as sodium hydroxide or sodium potassium, the choice of which will depend on the specific type of cross-linking agent used. If a dialdehyde compound is used as the cross-linking agent, an acid is used as the catalyst. The acid is preferably added in such an amount that its concentration in the aqueous solution will be at least 0.5N. If the cross-linking agent is an epihalohydrin compound, an alkali is used as the catalyst. The amount of alkali agent is preferably added so as to be at least 2N of concentration in the aqueous solution.

The cross-linking reaction, including the case where it is effected in water is preferably carried out in the presence of a salt such as sodium sulfate, sodium chloride, etc. The amount in which the salt is added will vary with the specific type of salt used but it is usually added in an amount of at least 6%, or the concentration at which the aqueous polyvinyl alcohol solution undergoes coagulation and precipitation during spontaneous gelling. For instance, sodium chloride is added in an amount of at least 20%, and sodium sulfate of at least 6%.

The cross-linked polyvinyl alcohol particles so prepared are separated from the reaction medium by filtration. Thereafter, the recovered particles are washed with water-miscible organic solvents such as acetone, methanol, etc. followed by thoroughly washing with water. For complete removal of the organic solvent, the separated cross-linked linked polyvinyl alcohol particles are preferably heated in water so that the organic solvent is eliminated by azeotropic distillation.

The porous cross-linked polyvinyl alcohol particles produced by the method of the present invention are useful as packing materials in chromatography, especially in aqueous-phase gel-permeation chromatography. If a water-soluble polymer such as dextran, polyethylene glycol, etc. that has high comparability with polyvinyl alcohol is added to the starting aqueous solution of polyvinyl alcohol, macro-porous cross-linked polyvinyl alcohol particles having an even higher exclusion limit of molecular weights can be attained. If desired, packing materials for use in various modes of chromatography such as ion-exchange chromatography, hydrophobic chromatography, affinity chromatography, and the like, can be prepared by introducing a various functional groups or ligands to hydroxyl groups in the polyvinyl alcohol.

When used as separating agents in the various fields of application mentioned above, the porous cross-linked polyvinyl alcohol particles of the present invention are usually adjusted to have an average particle size of from 20 to 1,000 μm, preferably from 50 to 200 μm, a water content of from 50 to 95%, preferably from 60 to 90%, and a degree of swelling of from 3 to 20 ml/g, preferably from 5 to 15 ml/g, of a dry resin. Among these physical characteristics, the average particle size can be readily imparted by proper selection of the conditions for dispersing polyvinyl alcohol in particles in an organic solvent, such as amount and type of each of the organic solvent and dispersion stabilizer used, and the desired water content and the degree of swelling can be readily attained by proper selection of the conditions for spontaneous gelling such as the molecular weight and amount of polyvinyl alcohol used and the gelling temperature.

The separating agents composed of the porous cross-linked polyvinyl alcohol particles of the present invention are highly hydrophilic and hence have the advantage of showing less non-specific adsorption of proteins. Because of this feature, the agents are useful for the purpose of separating a variety of proteins such as globulin, ferritin, albumin, myoglobin, etc. In addition, these separating agents exhibit superior mechanical strength due to the cross-linked structure of the polyvinyl alcohol particles of which they are composed.

The following examples are provided for the purpose of further illustrating the present invention but it should be understood that various modifications of these examples are possible without departing from the scope and spirit of the invention. In the examples, the water content and the degree of swelling, both being an index of porosity, were measured by the following methods.

Measuring the water content and the degree of swelling

A thoroughly water-washed resin is put into a 10-ml messcylinder and exactly 10 ml of the resin is metered with light tapping on the bottom of the cylinder. The resin is dehydrated with a centrifuge at 350 G for 5 minutes and its weight ($a_1$ g) is measured precisely. The resin is then vacuum-deried at 60° C. and at 10 mm Hg for 24 hours and its weight ($a_2$ g) measured again precisely. The water content and the degree of swelling of the resin can be calculated by the following formulae:

$$\text{Water content} = \frac{a_1 - a_2}{a_1} \times 100 \, (\%)$$

$$\text{Degree of swelling} = \frac{10}{a_2} \, (\text{ml/g})$$

EXAMPLE 1

A three-necked flask (0.5 l) equipped with a stirrer and a reflux condenser was charged with 250 ml of dichloroethane in which 0.5 g of cellulose acetate butyrate (CAB 381-20 of Eastman Kodak Company) was dissolved.

In a separate step, a three-necked flask (200 ml) equipped with a stirrer and a reflux condenser was charged with 5 g of sodium chloride and 50 ml of water. After a solution was formed by agitation, 5 g of a polyvinyl alcohol powder (Gosenol NLO5 of the Nippon Synthetic Chemical Industry Co., Ltd.) was added to the solution and the resulting dispersion was heated at 98° C. for 1 hour to make a solution. After being cooled to room temperature, the solution was dispersed in the previously prepared organic solvent. The dispersion was left at room temperature for 97 hours with agitation until a gel formed spontaneously. To the gel were added 50 ml of 20% aqueous NaCl solution and 12 ml of a cross-linking agent (25% glutaraldehyde), and 1 ml of 1N HCl was added to the stirred mixture. The resulting mixture was heated at 65° C. for 2 hours with agitation. Following addition of 10 ml of 5N HCl, the mixture was further heated at 65° C. for 2 hours to complete the cross-linking reaction.

The reaction mixture was cooled to room temperature, filtered, and washed first with methanol, then with water. The washed product was transferred into a three-necked flask (1 l) equipped with a stirrer. Following addition of 700 ml of water, the contents of the flask were heated at 95° C. for 1 hour to have the residual dichloroethane distilled off the cross-linked polyvinyl alcohol particles, which were then recovered from the flask and thoroughly washed with water.

The finally attained particles of cross-linked polyvinyl alcohol were milky-white color and spherical; the water content and the degree of swelling of these particles are shown in Table 1.

Measurement for pressure loss

A glass column (i.d., 8 mm) having water jacket was packed with a separating agent that was composed of the particles prepared in Example 1. The particles had been classified to a size range of 63 to 149 μm. The packed layer was 50 cm high. Distilled water was supplied from the top of the column at a constant flow rate, with the column being held at 25° C. by circulating water through the jacket. When the packed layer became stable and the reading of the pressure gage on top of the column levelled off, the latter was recorded. The same procedures were followed with the column left empty (i.e., unpacked with the separating agent). The reading of the pressure gage in this case was substracted from the value for the packed column so as to determine the pressure loss ($\Delta p$ in kg/cm$^2$/50 cm-bed).

Figure 2:
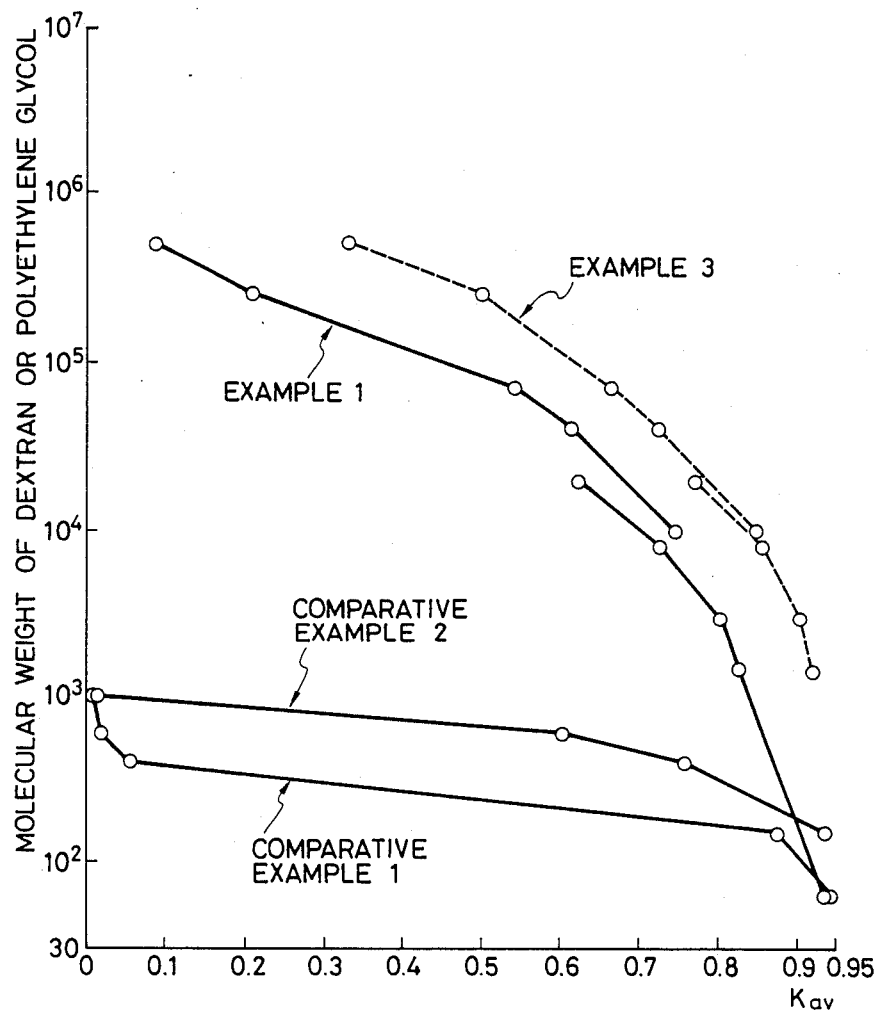
FIGS. 2 and 3 are calibration curves constructed by performing gel permeation chromatography with the samples of cross-linked polyvinyl alcohol particles prepared in Examples 1 and 3 and in Comparative Examples 1 and 2.

The results of pressure loss ($\Delta p$) measurement for varying values of flow rate (LV: linear velocity; unit: m/hr) are shown in FIG. 2 by line (1). Within the measured range of flow rates (LV $\leq$ 10 m/hr), a linear relationship was established between $\Delta p$ and LV with the separating agent of the present invention, and passage at a flow rate of as high as LV=10 m/hr was possible without causing deformation or disintegration of the carrier particles.

The same experiment was conducted on a cross-linked agarose gel and the resulting $\Delta p$ vs LV profile is shown in FIG. 1 by curve (2). When the cross-linked agarose gel was used as a medium, there occurred a marked increase in $\Delta p$ when the flow rate exceeded LV=1 m/hr and much difficulty was encountered in passage through the column at LV $\geq$ 2.5 m/hr.

EXAMPLE 2

Cross-linked polyvinyl alcohol particles were prepared by repeating the procedures of Example 1 except that the amount of polyvinyl alcohol used and the duration for which the aqueous solution of polyvinyl alcohol was left to cause spontaneous gelling were changed to the values shown in Table 1. The water content and the degree of swelling of the particles obtained are also shown in Table 1.

EXAMPLE 3

Two and a half gram of polyvinyl alcohol was dissolved in aqueous sodium chloride solution under the same conditions as employed in Example 1. Three milliliters of 5N NaOH was added to the solution and the mixture was stirred. After it was cooled to room temperature, the mixture was dispersed in the same organic solvent as used in Example 1 and the resulting dispersion was left at room temperature for 19 hours under agitation until a gel formed spontaneously. To the gel, 50 ml of 20% aqueous NaCl solution was added and the mixture was agitated for 5 hours. The mixture was filtered, washed first with methanol, then with water, and transferred into a three-necked flask (200 ml) equipped with a stirrer. Following addition of NaCl (20 g) and water (100 ml), 6 ml of an aqueous solution of 25% glutaraldehyde was charged into the flask under agitation. Thereafter, 1 ml of 1N HCl was added and the contents of the flask were heated at 65° C. for 2 hours with agitation. Subsequently, 10 ml of 5N HCl was added and the mixture was heated at 65° C. for 2 hours until the cross-linking reaction was completed. After it was cooled to room temperature, the reaction mixture was filtered and thoroughly washed with water.

The finally attained particles of cross-linked polyvinyl alcohol was milky-white and spherical; the water content and the degree of swelling of these particles are shown in Table 1.

EXAMPLE 4

Cross-linked polyvinyl alcohol particles were prepared by repeating the procedures of Example 3 except that the type and amount of polyvinyl alcohol used and the amount of 5N NaOH added were changed to those shown in Table 1. The water content and the degree of swelling of the particles obtained are also shown in Table 1.

EXAMPLE 5

A polyvinyl alcohol solution was prepared as in Example 3 except that the type and amount of polyvinyl alcohol used were changed to those shown in Table 1. This solution was dispersed in an organic solvent in which 1.13 g of ethyl cellulose (EC-T100 of Hercules Incorporated) was dissolved in 125 ml of toluene. Subsequent procedures were the same as in Example 3 except that the amount of aqueous solution of 25% glutaraldehyde was changed to the value shown in Table 1. The water content and the degree of swelling of the cross-linked polyvinyl alcohol particles obtained are also shown in Table 1.

COMPARATIVE EXAMPLE 1

Polyvinyl alcohol was dissolved in aqueous sodium chloride solution under the same conditions as employed in Example 1. The solution was cooled to 0° C. and 6 ml of an aqueous solution of 25% glutaraldehyde and 1 ml of 1N HCl were added to the solution, followed by rapid agitation. The mixture was dispersed at room temperature in the same organic solvent as used in Example 1, and the dispersion was agitated at room temperature for 15 minutes. Immediately thereafter, cross-linking reaction and washing were conducted as in Example 1.

The water content and the degree of swelling of the finally obtained polyvinyl alcohol particles are shown in Table 1.

COMPARATIVE EXAMPLE 2

Cross-linked polyvinyl alcohol particles were prepared as in Comparative Example 1 except that the amount of aqueous solution of 25% glutaraldehyde was changed to the value shown in Table 1. The water content and the degree of swelling of the particles are shown in Table 1.

APPLICATION EXAMPLE 1

Four glass columns (10 mm$^\phi$ × 500 mm$^H$) were filled with the samples of the cross-linked polyvinyl alcohol particles that were prepared in Examples 1 and 3 and Comparative Examples 1 and 2. After thoroughly washing with water, calibration curves were obtained and the performance of the particles as packing materials for use in gel permeation chromatography were evaluated by the following procedures.

Each of the columns was charged with 100 $\mu$l of an aqueous solution (5 w/v%) of dextran with a known molecular weight and 300 $\mu$l of an aqueous solution (2 w/v%) of polyethylene glycol with a known molecular weight; thereafter, distilled water was passed through the column at a flow rate of 0.4 ml/min to elute the dextran and polyethylene glycol; the dextran and polyethylene glycol in the effluent were detected with a differential refractometer and the eluting position (the position of the peak maximum) was determined for each sample. The obtained calibration curves are shown in FIG. 2.

APPLICATION EXAMPLE 2

The cross-linked polyvinyl alcohol particles prepared in Example 5 were sieved to obtain particle sizes within the range of 63 to 105 $\mu$m. The classified particles were filled into a glass column (i.d., 8.2 mm; height, 500 mm) and thoroughly equilibrated with a 50 mM phosphate buffer solution (pH, 7.40) containing 150 mM NaCl. A calibration curve for molecular weight distribution of proteins was obtained and the performance of the particles for use as a packing material in gel permeation chromatography was evaluated by the following procedures.

Six proteins (thyroglobulin, ferritin, bovine serum $\gamma$-globulin, bovine serum albumin, ovalbumin and myoglobin) having different molecular weights were dissolved in a 50 mM phosphate buffer (pH, 7.40) containing 150 mM NaCl so as to form solutions each having a concentration of 0.1%. A portion (150 $\mu$l) of each of these solutions was charged into the above-described column and the respective proteins were eluted by allowing a 50 mM phosphate buffer solution containing 150 mM NaCl to pass through the column at a flow rate of 0.2 ml/min. Protein detection was conducted with a UV monitor (280 nm).

Based on the eluting positions of respective proteins, their Kav values were calculated by the following equation and plotted against the molecular weight to obtain a calibration curve:

$$K_{av} = \frac{V_e - V_o}{V_t - V_o}$$

where $V_t$: the total volume of separating agent (ml);

TABLE 1

| Conditions and Results | Example 1 | Example 2 | Example 3 | Example 4 | Example 5 | Comparative Example 1 | Comparative Example 2 |
|---|---|---|---|---|---|---|---|
| Polyvinyl alcohol* | NL-05 | NL-05 | NL-05 | NL-18 | NH-18 | NL-05 | NL-05 |
| Amount of polyvinyl alcohol added (g) | 5 | 7.5 | 2.5 | 1.5 | 5 | 5 | 5 |
| Amount of 5 N NaOH added (ml) | — | — | 3 | 5 | 3 | — | — |
| Time permitted to stand for spontaneous gelling (hr) | 97 | 25 | 19 | 19 | 19 | — | — |
| Amount of aqueous solution of 25% glutaraldehyde added (ml) | 12 | 12 | 6 | 6 | 1 | 6 | 10 |
| Water content (%) | 85.2 | 80.6 | 88.7 | 90.0 | 79.6 | 87.0 | 89.7 |
| Degree of swelling (ml/g) | 12.5 | 8.8 | 15.0 | 21.0 | 11.8 | 12.7 | 15.0 |

*GOSENOL Series of The Japan Synthetic Chemical Industry Co., Ltd.

Ve: the elution volume (ml);
Vo: the void volume (ml) measured on Blue Dextran with an approximate molecular weight of $2 \times 10^6$.

Figure 3:
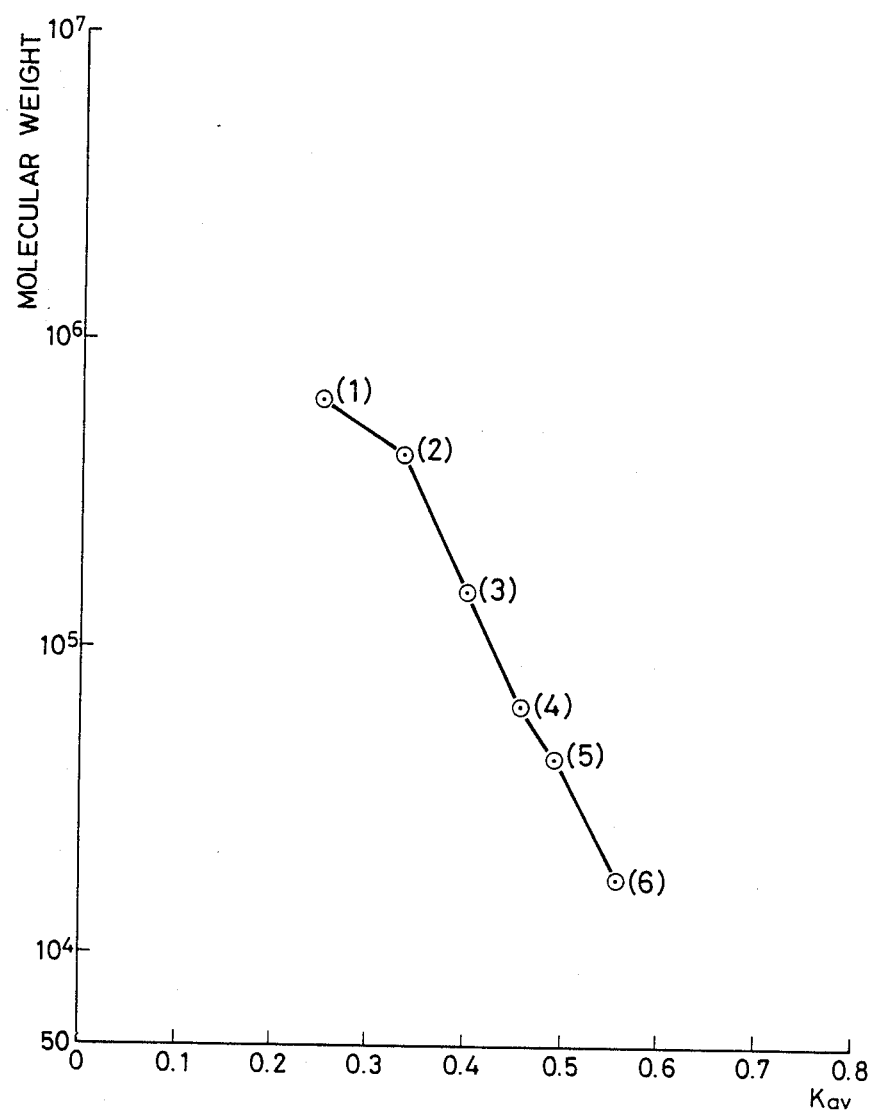

The constructed calibration curve is shown in FIG. 3. Its linearity shows that the separating agent composed of the cross-linked polyvinyl alcohol particles prepared in accordance with the present invention is suitable for use as a packing material in gel permeation chromatography. The molecular weights and isoelectric points of the eluted proteins are noted below:

| No. in FIG. 3 | Protein | Molecular weight ($\times 10^3$) | Isoelectric point |
|---|---|---|---|
| 1 | thyroglobulin | 667 | 4.5 |
| 2 | ferritin | 440 | 4–5 |
| 3 | bovine serum γ-globulin | 159 | 5.8–7.3 |
| 4 | bovine serum albumin | 66.3 | 4.6–4.8 |
| 5 | ovalbumin | 45 | 4.6 |
| 6 | myoglobin | 17.8 | 8.1–8.2 |

The cross-linked polyvinyl alcohol particles prepared in accordance with the present invention are macroporous and have a high exclusion limit of molecular weights. In spite of their high water content, the particles have high mechanical strength and are specifically useful as a packing material in aqueous-phase gel permeation chromatography of high-molecular weight substances such as proteins.

While the invention has been described in detail and with reference to specific embodiment thereof, it will be apparent to one skilled in the art that various changes and modifications can be made therein without departing from the spirit and scope thereof.

What is claimed is:

1. Porous cross-linked polyvinyl alcohol particles prepared by;
    dispersing an aqueous solution of a mixture of polyvinyl alcohol and a salt in an organic solvent to spontaneously form a porous and water-insoluble gel in the absence of a cross-linking agent; and
    reacting said gel with a cross-linking agent.
2. Porous cross-linked polyvinyl alcohol particles according to claim 1, wherein the cross-linking agent is a dialdehyde compound.
3. Porous cross-linked polyvinyl alcohol particles according to claim 1, wherein the reaction with a cross-linking agent is carried out in the presence of an acid catalyst.
4. Porous cross-linked polyvinyl alcohol particles according to claim 1, wherein the reaction with a cross-linking agent is carried out in an aqueous medium.
5. Porous cross-linked polyvinyl alcohol particles according to claim 1, wherein the organic solvent is a halogenated hydrocarbon.

* * * * *